United States Patent [19]

Gyugyi

[11] Patent Number: 4,571,535
[45] Date of Patent: Feb. 18, 1986

[54] VAR GENERATOR HAVING CONTROLLED DISCHARGE OF THYRISTOR SWITCHED CAPACITORS

[75] Inventor: Laszlo Gyugyi, Penn Hills Township, Allegheny County, Pa.

[73] Assignee: Westinghouse Electric Corp., Pittsburgh, Pa.

[21] Appl. No.: 671,844

[22] Filed: Nov. 15, 1984

[51] Int. Cl.[4] .................. G05F 1/70; H02H 7/09
[52] U.S. Cl. ...................... 323/211; 363/54; 363/68; 361/56; 361/91
[58] Field of Search ............. 323/208–211; 363/54, 68; 307/252 L, 252 N, 252 Q; 361/56, 91, 111, 126–127

[56] References Cited

U.S. PATENT DOCUMENTS

| | | | |
|---|---|---|---|
| 3,731,183 | 5/1973 | Johnson et al. | 323/237 |
| 3,936,727 | 2/1976 | Kelley, Jr. et al. | 323/210 |
| 3,943,427 | 3/1976 | Tolstor et al. | 363/68 |
| 3,947,726 | 3/1976 | DeCecco et al. | 363/68 X |
| 3,999,117 | 12/1976 | Gyugyi et al. | 323/211 |
| 4,047,097 | 9/1977 | Gyugyi et al. | 323/211 |
| 4,075,510 | 2/1978 | Pascente | 307/252 B |
| 4,104,576 | 8/1978 | Frank | 323/210 |
| 4,234,843 | 11/1980 | Gyugyi et al. | 323/210 |
| 4,274,135 | 6/1981 | Rosa et al. | 363/68 |
| 4,282,568 | 8/1981 | Kobayashi et al. | 363/68 X |
| 4,307,331 | 12/1981 | Gyugyi | 323/210 |
| 4,414,599 | 11/1983 | Kobayashi | 363/68 X |
| 4,475,139 | 10/1984 | Chadwick | 363/68 X |

*Primary Examiner*—Peter S. Wong
*Attorney, Agent, or Firm*—John V. Pezdek

[57] ABSTRACT

A device is taught for controlling the residual charge on a thyristor switched capacitor. A capacitor is in series circuit relationship with at least two bidirectional back-to-back thyristor switches which are then connected across an AC network. Each back-to-back thyristor combination is shunted by a non-linear clamping device which exhibits a very high resistance below a specified voltage level and a very low resistance above that voltage level. A pulse stretcher and a sequential firing circuit arrangement is used to prolong the conduction of one of the thyristor switches at a time to allow the shunting of its associated clamping device. During an overvoltage condition in the AC network, the residual charge on the capacitor will be limited to the breakdown voltage of the conducting clamping device. A plurality of capacitor, thyristor switch, non-linear clamping device combinations may be utilized in parallel with the AC network.

14 Claims, 10 Drawing Figures

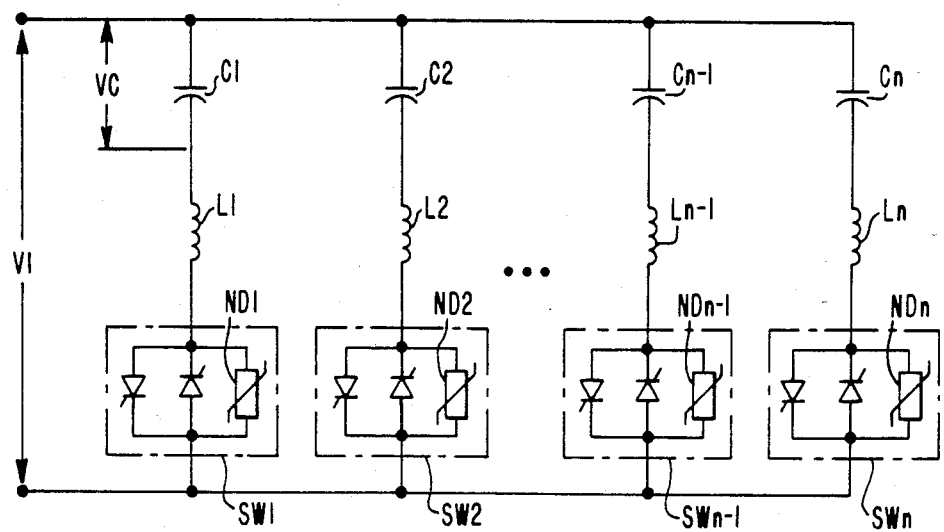
FIG. 1
PRIOR ART
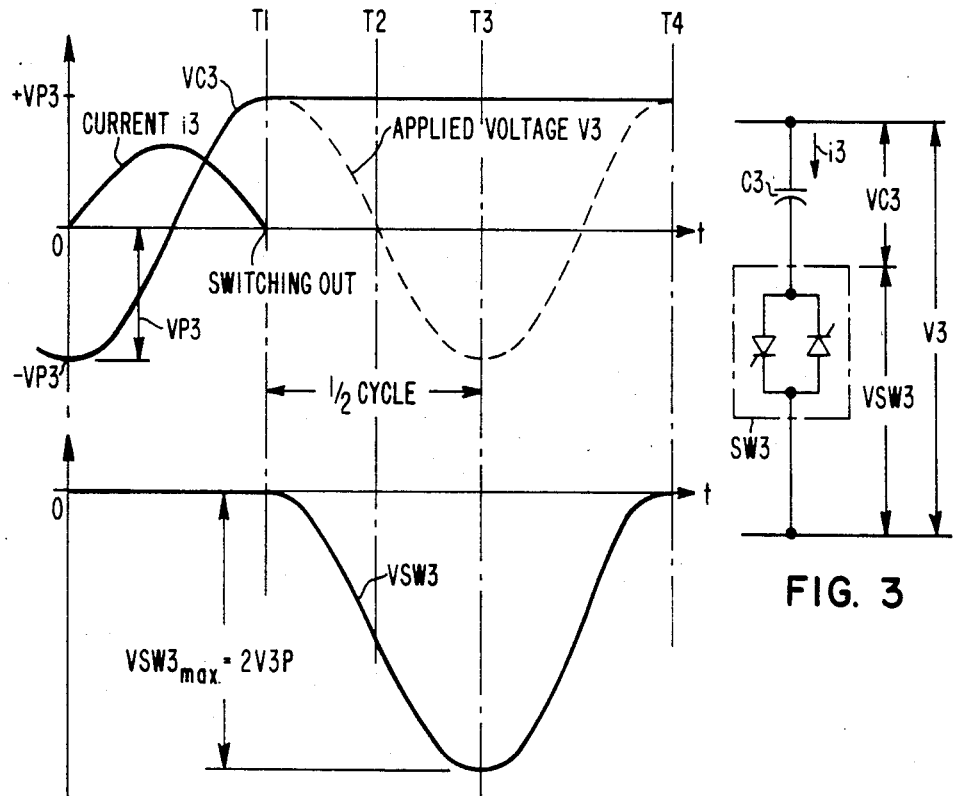
FIG. 3
FIG. 3A

VAR GENERATOR HAVING CONTROLLED DISCHARGE OF THYRISTOR SWITCHED CAPACITORS

BACKGROUND OF THE INVENTION

This invention relates generally to VAR generators and more specifically to VAR generators employing thyristor switched capacitors.

Early VAR generator designs utilized the concept of a thyristor controlled inductor and a fixed or mechanically switched capacitor network to provide power factor correction for industrial loads such as melting furnaces. Examples of this approach can be found in U.S. Pat. No. 3,936,727, "High Speed Control of Reactive Power for Voltage Stabilization in Electric Power Systems" issued Feb. 3, 1976 to Kelley, Jr. et al.; U.S. Pat. No. 4,047,097, "Apparatus and Method for Transient Free Energization and Deenergization of Static VAR Generators" issued Sept. 6, 1977 to Gyugyi et al.; U.S. Pat. No. 3,999,117, "Method and Control Apparatus for Static VAR Generator and Compensator" issued Dec. 21, 1976 to Gyugyi et al.; and, U.S. Pat. No. 4,274,135, "Gating Circuit for High Voltage Thyristor Strings" issued June 16, 1981 to Rosa et al. With the advent of using VAR generators for compensating transmission lines the use of thyristor controlled inductors with fixed capacitors fell into disfavor because of the high power losses, typically one percent of the system power, associated with these circuits. As a result, more efficient VAR generators using thyristor switched capacitors with thyristor controlled inductors were developed.

Examples of thyristor switched capacitors in static VAR generators may be found in U.S. Pat. No. 4,307,331 "Hybrid Switched-Capacitor Controlled-Inductor Static VAR Generator and Control Apparatus" issued Dec. 22, 1981 to Gyugyi and U.S. Pat. No. 4,234,843 "Static VAR Generator with Discrete Capacitive Current Levels" issued Nov. 18, 1980 to Gyugyi et al. and U.S. Pat. No. 4,104,576, "Equipment With Controlled Reactance" issued Aug. 1, 1978 to Frank. In these types of static VAR generators, a capacitor bank is formed from a number of capacitors, each one typically in series with a bidirectional thyristor switch and a current limiting inductor. In schemes such as may be found in the above-mentioned patents, the thyristor switches are normally fired in response to a VAR demand signal at the times when capacitor voltage and the AC network voltage are equal, that is when the voltage across the thyristor switches is zero. However, the disconnection of the capacitor banks takes place at the instant when their current becomes zero. At these instants of time the voltage across the capacitor bank is equal to the peak of the AC network voltage. After disconnection, the capacitor bank remains charged to that voltage. Because the capacitor bank remains charged to the peak of the AC network voltage applied, the voltage across the thyristor switch will be the difference between the applied AC system voltage and the capacitor charge voltage. This difference reaches a maximum value of twice the peak AC voltage once in each cycle. As a result at a minimum the thyristor switch must be able to withstand or block this voltage.

The necessity to block two times the peak AC voltage will not normally present a problem in maintaining thyristor switch integrity. However, under some conditions of the AC supply network, the AC voltage may transiently increase well above it nominal peak values to excessively high voltage levels. Should the capacitor banks be disconnected when this high level voltage is present, both the capacitor bank and the thyristor switch would be subjected to an excessively high voltage. One solution which is known in the art is to utilize a non-linear clamping device connected across the thyristor switch. For reliability the breakover voltage level of a present day non-linear clamping device is designed to be approximately twice as high as the normal maximum operating voltage they would be expected to encounter. For a thyristor switched capacitor normal maximum voltage would be twice the normal peak voltage, making the breakover voltage about 4 times the normal peak voltage. Thus the maximum residual voltage across a capacitor bank would remain high and the maximum voltage across the thyristor switch can be as great as four times the peak voltage level encountered in normal operation. Therefore, under severe overvoltage conditions utilizing the present art such as may be found in the above-mentioned patents, both the capacitor bank and the thyristor switch typically would be subjected to twice the normal operating voltage stresses. Further, if a thyristor is fired either intentionally or unintentionally, a heavily overcharged capacitor could be reconnected to the AC network which may result in a very large surge current through the thyristor switch and a substantial transient disturbance in an AC network.

As a result of the overvoltage conditions which can occur with the thyristor switched capacitor various protection schemes have been proposed. In U.S. Pat. No. 3,731,183, "Power Control and Phase Angle Correcting Apparatus" issued May 1, 1973 to Johnson et al., a non-linear clamping device to limit voltage transients occurring across the secondary of the coupling transformer and is in effect in parallel with all the circuit branches, each circuit branch composed of a thyristor switch, a capacitor and an inductor in series connection. However, with this arrangement discharge of the capacitor in any manner is not possible. Only the maximum voltage applied to the whole compensating system is limited using this approach. In U.S. Pat. No. 4,075,510, "Thyristor Voltage Switching Circuits" issued Feb. 21, 1978 to Pascente, the use of a non-linear clamping device across a semi-conductor switch is shown as a prior art protection means. This arrangement was believed by Pascente to be unreliable because in the resistive inductive load circuit considered by Pascente the clamping device would be subjected to repeated voltage surges and may burn out. There, in order to avoid the destruction of the clamping device during overvoltage conditions, the semi-conductor switch is turned on to shunt the clamping device instead of allowing the clamping device to limit the overvoltage on the switch. Thus the switch acts as a protective device for the clamping device, not the converse.

In U.S. Pat. No. 4,274,135, "Gating Circuit For High Voltage Thyristor Strings" issued June 16, 1981 to Rosa et al., the protection of the thyristor switches is achieved by being able to keep the thyristors in full conduction continuously during system overvoltages. There the thyristor switch is brought into full conduction and the reactive impedance in series with the thyristor switch is subjected to the system overvoltage. The reactive impedance conducts heavy currents during the overvoltage intervals. However, this protection method is not practical if the reactive impedance is capacitive because the connection of a charged capacitor to a power system would aggravate overvoltage conditions. In fact, it is known that capacitors are disconnected during overvoltages to prevent this problem. Other examples of protection circuits for thyristor switches are shown in U.S. Pat. No. 3,947,726, "Reverse Voltage Surge Protection for High Voltage Thyristors" issued Mar. 30, 1976 to DeCecco et al.; U.S. Pat. No. 3,943,427, "Apparatus for Protecting the Thyristors of a High Voltage Convertor From Overvoltage" issued Mar. 9, 1976 to Tolstov et al.; and, U.S. Pat. No. 4,282,568, "Electric Power Converting Apparatus" issued Aug. 4, 1981 to Kobayashi et al. In general these three patents deal with the protection of unidirectional thyristor switches used in AC/DC power converters not the bidirectional thyristor switches used in VAR generators considered in the present invention. In DeCecco non-linear clamping devices are used to protect individual thyristors in a high voltage thyristor switch against reverse voltage transients generated when the thyristor switches turn off. The non-linear clamping device is connected in series with an auxiliary thyristor switch, the combination in shunt with each thyristor of the whole switch. The auxiliary thyristor is triggered into conduction at some voltage level below the avalanche breakdown voltage of the main thyristor in the thyristor switch thereby connecting the clamping device in parallel with the main thyristor. This method is essentially an elaborate snubber circuit arrangement to handle the dynamic voltage transients and voltage sharing for each element of the unidirectional thyristor switch. However, this approach is inapplicable when used with thyristor switched capacitors because these thyristors are not subjected to high voltage transients at the instant of turn off. In Tolstov et al. the protection circuit utilizes an auxiliary clamping circuit to protect non-linear clamping devices that are connected in parallel with each thyristor or thyristor group. A sensing circuit detects high current in a chain of individual clamping devices and activates an auxiliary clamping circuit to limit the voltage below the total breakover voltage represented by the sums of the individual clamping devices. However, this protection scheme is utilized in AC to DC power converters and is not usable for the controlled discharge of thyristor switched capacitors. In Kobayashi et al. non-linear resistors are connected in parallel with individual thyristors or thyristor groups of a thyristor switch composed of series connected devices and are used in an overall voltage sharing network. With Kobayashi et al. DeCecco et al. and Tolstov et al. the thyristor protection schemes are utilized in AC to DC converters. With these devices the thyristors are used as unidirectional devices and are all turned off simultaneously and therefore unavailable to accomplish controlled discharge of a capacitor bank.

All of these protection schemes fall into one of two categories. The first inhibits the disconnection of the capacitor bank under high AC network voltage conditions (by keeping the thyristor switch conductive). The second uses a metal oxide varistor or surge arrestor across the thyristor switch to limit the overvoltage to an acceptable value. The drawback with the first approach is that the connected capacitor C3 will increase the already high network voltage (due to the leading current it draws through the basically inductive AC network) and can also create dangerous oscillatory conditions in the network which may further aggravate overvoltage problems. With the second approach, the breakover voltage required for reliable operation of the clamping device can result in the capacitor being charged to a voltage having a value up to two times normal peak voltage of the system. This requires that the voltage rating of the thyristor switch be increased suitably to withstand these increased voltages.

One object of the present invention is to provide a reliable method of overvoltage protection for thyristor switched capacitors in a VAR generator. A further objective is to provide controlled discharge of the thyristor switched capacitor banks without requiring an impractically low clamping voltage level for the protected devices. Another objective is to reduce the required voltage surge rating of the thyristor switch assembly thereby providing cost as well as size benefits.

SUMMARY OF THE INVENTION

A VAR generator of the type which supplies reactive power to an AC electrical system for regulation thereof is taught. A capacitive reactive device that included a capacitor is interconnected with an electrical system for supplying reactive power to the electrical system during a predetermined interval of time. At least a two controllable bidirectional thyristor switch devices, each of which may be composed of two back-to-back unidirectional devices, are interconnected in series circuit relationship with the capacitive reactive device and is used for connecting the capacitor reactive device in reactive circuit relationship with the electrical system during this same interval of time. Connected in parallel with each of the bidirectional switch devices are non-linear voltage clamping devices. During a period of time subsequent to the disconnection of the capacitor bank under overvoltage conditions, one or more of the clamping devices conduct capacitive discharge current when its associated switch device is in the OFF state with the remaining switch devices being in the ON state and shunting their associated clamping devices. The alternate states of the switch devices causing the residual charge on the capacitive reactive device to be limited to the sum of the breakover voltages of the clamping devices not being shunted by their associated switch devices. In an alternate embodiment where two switch devices and two clamping devices are used, on each disconnection of the capacitor the ON switch and the OFF switch are alternated allowing their associated clamping devices to share, on the average, the voltage stresses caused during capacitor disconnection and discharge each period of overvoltage.

BRIEF DESCRIPTION OF THE DRAWINGS

Reference is now made to the description of the preferred embodiment, illustrated in the accompanying drawings, in which:

FIG. 1 is a schematic diagram of a portion of a static VAR generator showing the circuit arrangement of a thyristor switch with respect to a capacitor;

FIG. 3 is a schematic diagram of a typical thyristor capacitor circuit;

FIG. 3A is a waveform diagram of the current and voltage associated with the circuit shown in FIG. 3;

DESCRIPTION OF THE PREFERRED EMBODIMENT

Referring now to FIG. 1 there is shown a schematic diagram of a VAR generator as used in the prior art. Here it can be seen that a number of capacitor banks may vary with the transient characteristics and/or VAR problems upstream and/or downstream of the circuit. Therefore, a number of capacitors C1, C2 through Cn are utilized in series circuit relationship with a bidirectional thyristor switches SW1, SW2 through SWn and possibly a surge current limiting inductors L1, L2 through Ln. Non-linear voltage clamping devices ND1 through NDn, such as metal oxide varistors or surge arrestors, can be connected in parallel with each of the thyristor switches SW1 through SWn. These clamping devices provide protection from overvoltages that can occur in the AC electrical applied system.

As is usual in the art, thyristor switches SW1 through SWn are fired or gated in response to a VAR demand signal at a time when the capacitor voltage VC and the AC network voltage V1 are equal. At this point, the voltage across the thyristor switches SW1 through SWn is zero. The disconnection of the capacitor banks takes place at an instant when the current crosses zero in the thyristor switch SW1 through SWn. At these instants, the voltage across the capacitor bank, VC, is equal to the normal peak voltage, VP, of the AC network voltage V1. Because the thyristor switches in the OFF state represent a high impedance, they are considered to essentially be an open circuit, preventing the discharge of the capacitor bank. The capacitor banks remain charged to normal peak system voltage. The preferred operation of the thyristor switches is to have turn on occur when the voltage across them is zero. Turn off can occur when the current being conducted through the switches is zero. This current zero and voltage zero occur one-half cycle of the system frequency apart.

Figure 2A:
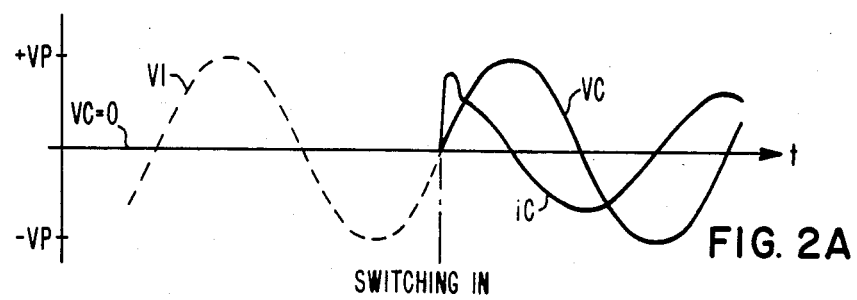
FIGS. 2A through 2D is a waveform diagram of the voltage and current characterizing the connection and disconnection of a capacitor bank under different switching conditions.
Figure 2B:
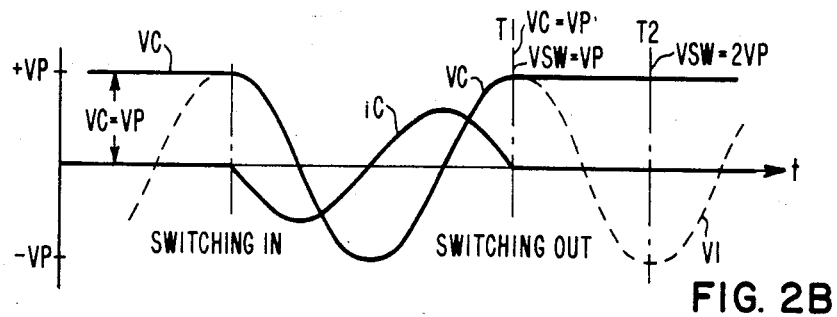
Figure 2C:
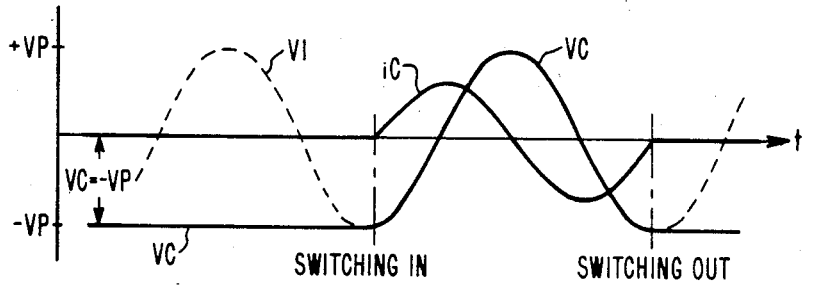
Figure 2D:
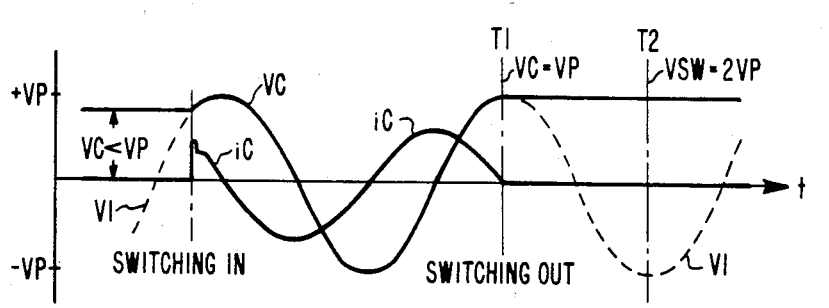

Referring to FIGS. 2A through 2D a graphical representation of the voltage and current waveforms characterizing the connection (switching in) and disconnection (switching out) of a capacitor bank under different permitted switching conditions is illustrated. At FIG. 2A a condition for connection at the zero crossing of AC network voltage V1 is illustrated. In this situation when the AC network voltage V1 is zero, the capacitor such as C1 (of FIG. 1) for instance is switched in allowing current IC to flow and allowing voltage VC which is essentially equal to the AC network voltage V1 to be impressed across the capacitor C1. This condition typically exists at start-up or when the capacitor bank C1 through Cn is allowed to be completely discharged. At FIGS. 2B and 2C the switching of positively and negatively charged capacitor banks, respectively, at the peak voltage VP of the applied voltage V1 is illustrated. Note that in FIG. 2B the switching in occurs on a positive peak (+VP) of system voltage V1 and in FIG. 2C, the switching occurs at a negative peak (−VP) of system voltage V1. Note also that switching out occurs at the appropriate positive and negative voltage peaks respectively. Also to be noted for FIGS. 2B and 2C is that the switching out occurs at the zero crossing for the network current. At FIG. 2D a condition when a discharging capacitor is switched in is illustrated. Note that switching in occurs where the capacitor voltage $V_C$ is less than the normal peak voltage VP of the line voltage V1. Switching out occurs at the positive voltage peak in this instance.

Referring now to FIGS. 3 and 3A there is shown a schematic diagram of a capacitor thyristor switch combination without a surge current limiting inductor and the associated waveforms. Point T1 represents the start of a cycle of the applied system voltage V3, point T4 the end of the cycle. In FIG. 3A at the point of switching out the voltage across the capacitor bank VC3 is equal to the normal peak voltage VP3 of the AC electrical system. This is at T1. At point T2, the polarity of the applied system voltage V3 reverses and reaches its maximum value of −VP3 at point T3. In general, the total voltage across the thyristor switch SW3 would be equal to the difference between the voltage VC3 across the capacitor bank and the applied system voltage V3. However, because VC3 equals VP3 at point T1 and because the capacitor bank has not been discharged at point T3, VC3 still equal VP3. Thus, at T3 the magnitude of the voltage across the thyristor switches is determined by Equation 1:

$$VSW3 = VC3 - V3 \tag{1}$$

At point T3

$$VC3 = VP3 \tag{2}$$

$$V3 = -VP3 \tag{3}$$

substituting for VC3 and V3 into Equation 1:

$$VSW3 = VP3 - (-VP3) = 2VP3 \tag{4}$$

Thus, at T3 the magnitude of the voltage across the thyristor reaches a maximum. The first maximum of the voltage across the thyristor switch is reached one-half cycle after the capacitor has been disconnected (point T1) which is at the peak of the applied system voltage V3 following the first change of polarity after such disconnection. The maximum voltage for VSW3 is reached once each cycle. As a result, for normal operation the thyristor switches must have a voltage rating at least equal to twice the normal peak voltage of the AC system, i.e., VSW=2VP where VSW represents the voltage rating of the thyristor switch.

Under some conditions of the AC supply network such as, for example, removal of a short circuit or load rejection, the AC system voltage V3 may transiently increase well above its nominal peak value thereby charging the connected capacitor C3 to high voltage levels. During this overvoltage condition capacitive VAR compensation of the AC network is undesirable and it is well known that the capacitor bank should be disconnected. However, if this were to be done the thyristor switch SW3 would be exposed to high overvoltage during the next half cycle when the AC voltage reverses and the capacitor bank would be exposed to high DC voltage stress.

To protect the thyristor switch SW3 against high voltage stress caused by the overcharged capacitor C3, the prior art protection arrangements typically would:

(1) inhibit the disconnection of the capacitor bank under high AC network voltage conditions (by keeping the thyristor switch SW3 conductive); or (2) provide a metal oxide varistor or surge arrestor across the thyristor switch to limit the overvoltage to an acceptable value. The drawback with the first approach is that the connected capacitor C3 will increase the already high network voltage (due to the leading current it draws through the basically inductive AC network) and can also create dangerous oscillatory conditions in the network which may further aggravate overvoltage problems. With the second approach, the characteristics of the voltage clamp determine the minimum level of overvoltage at which it will function reliably. Under normal conditions, the voltage clamp appears to be a high impedance device having essentially no current flow. When the voltage applied to the device exceeds a certain predetermined breakover voltage, VBRK, current flow through the device begins causing the voltage to be limited to a value essentially equal to the breakover voltage. In order to ensure reliable operation of a metal oxide device, the clamping or breakover voltage is chosen to be in the range of about 1.8 to 2 times the maximum value for VSW3 determined previously. Thus, for the system shown in FIG. 3, the minimum overvoltage at which a metal oxide device would reliably operate would be approximately 3.6 to 4 times the normal peak voltage of the AC system. Equations 5 and 6 illustrate how these values are obtained:

$$VBRK = (1.8 \text{ to } 2)VSW3 \quad (5)$$

where
VBRK = Breakover Voltage
Substituting equation (4)

$$VBRK = (1.8 \text{ to } 2)(2VP3) = (3.6 \text{ to } 4)VP3 \quad (6)$$

The problem with this second approach is that the maximum voltage the thyristor switch is exposed to is 3.6 to 4 times the normal peak voltage of the AC system. The maximum voltage the capacitor bank is left charged to is about 1.8 to 2 times the normal peak voltage of the AC system. Preferably, the breakover voltage of the metal oxide varistor should be made to be approximately equal to the maximum voltage (2 times the normal peak voltage of the AC system) that would normally be present across the thyristor switch. Because this cannot be accomplished with a single clamping device, the rating of the thyristor switches must be increased to be able to withstand this increased voltage level. Additionally, after the occurrence of the overvoltage, the capacitor bank must also handle the high DC voltage stress due to overcharge.

Under severe overvoltage conditions, both the capacitor C3 and the thyristor switch SW3 typically would be subjected to twice the normal operating voltage stress. This condition for capacitor C3 would normally extend for many seconds until the internal discharge resistor (normally built into the capacitor as a unit) would reduce the residual voltage. During this discharge period time any accidental or purposeful reconnection of a heavily overcharged capacitor to the AC network may result in very large surge currents through the thyristor switch SW3 and may propagate a substantial transient disturbance in the AC network voltage V3. Therefore, a contradiction between the requirements of the AC supply network and the safe operation of the thyristor switch SW3 exists. While the former would necessitate the rapid disconnection of the capacitor C3, the latter would require that the thyristor switch SW3 be conductive until such time as the AC network voltage V3 decreases to a normal level.

Figure 4:
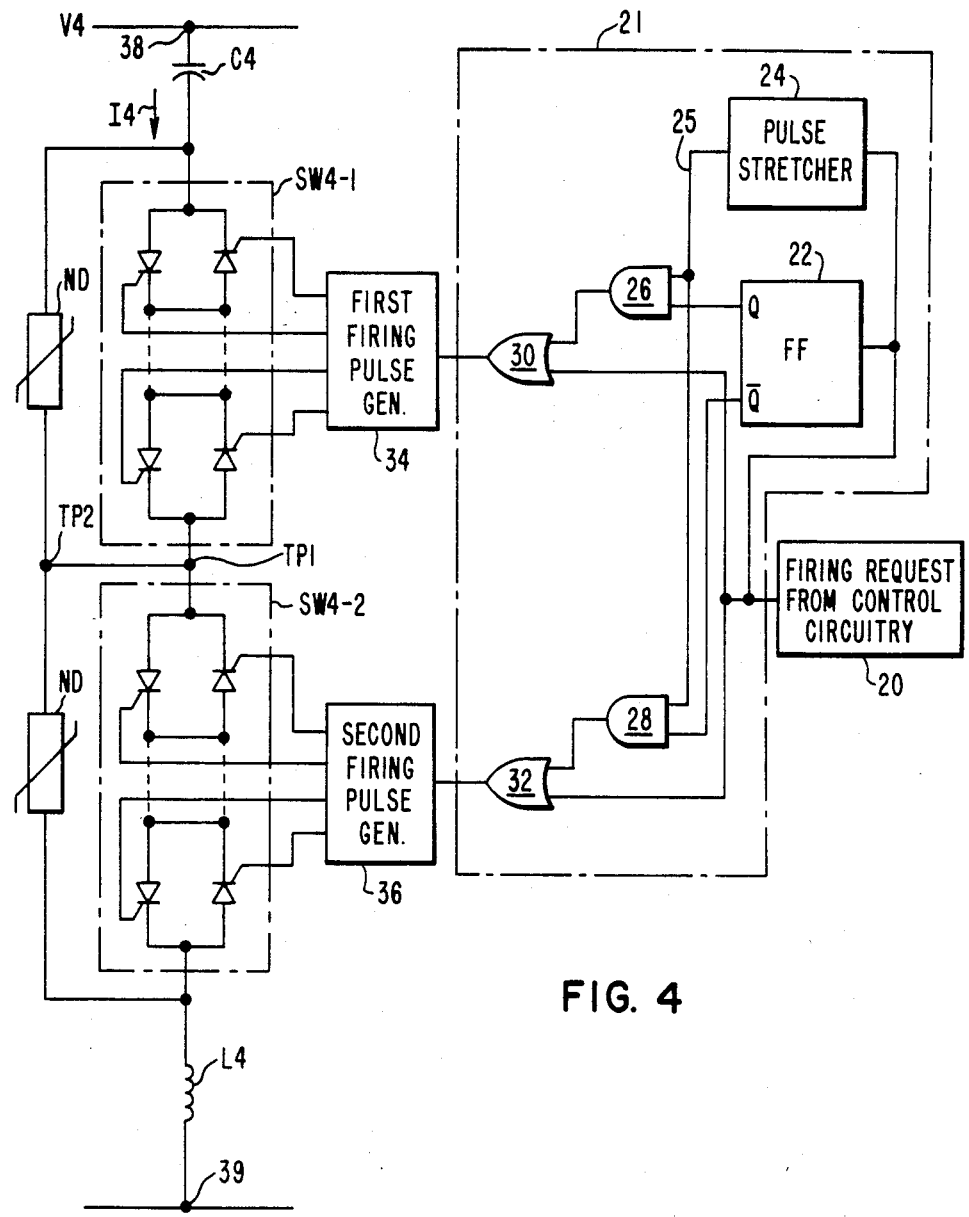
FIG. 4 is a schematic diagram of a capacitor-thyristor switch combination utilizing a non-linear clamping devices with associated firing pulse generators of the present invention.

Referring now to FIG. 4 a schematic diagram of the preferred embodiment of the present invention is shown. The construction of the shown schematic allows a signal which is received from a firing request control circuit to control the sequencing of the thyristor switches SW4-1 and SW4-2. A suitable firing control circuit may be found in U.S. Pat. No. 4,274,135 previously cited and which is incorporated by reference herein. The capacitor bank is part of a VAR generator described in U.S. Pat. No. 4,234,843 mentioned previously and which is also incorporated by reference herein. Therefore, only a brief description will be found below.

A signal 20 from a firing request control circuit is received at the control circuit 21. This signal is received at an input of OR gates 30 and 32 which are, in the preferred embodiments of the present invention, two input OR gates. The input signal 20 is also sent to the input of flip-flop 22 which in the preferred embodiment of the present invention is a D-type flip-flop and to the input of pulse stretcher 24. The output 25 of pulse stretcher 24 is connected to each of one of two inputs of AND gates 26 and 28. The Q output of flip-flop 22 is then connected to the remaining input of AND gate 26 and the $\overline{Q}$ output of flip-flop 22 is connected to the remaining input of AND gate 28. The outputs of AND gates 26 and 28 are connected to the remaining input of OR gates 30 and 32, respectively. The outputs of the OR gates 30 and 32 are connected to the input of the first firing pulse generator 34 and the second firing pulse generator 36, respectively. The outputs of the first firing pulse generator 34 are connected to each of the gates of the thyristors in thyristor switch SW4-1. Similarly the outputs of the second firing pulse generator 36 are connected to the gates of the thyristors contained in thyristor switch SW4-2. The thyristor switches SW4-1 and SW4-2 are, in the preferred embodiment of the present invention, comprised of semiconductor thyristor devices. A relatively large number of series connected back-to-back thyristor device pairs may be utilized, such pair forming two "half" switches that are used to construct either switch SW4-1 or SW4-2. Connected across each thyristor switch SW4-1 and SW4-2 is a non-linear device ND1 and ND2 respectively. The non-linear devices ND1 and ND2 in the preferred embodiment of the present invention are conventional or zinc-oxide type voltage surge arrestors having a volt/ampere characteristic such that below a voltage level, which is known as a clamping or breakover voltage, they exhibit a very high resistance while above that level a low resistance (ideally approaching zero). The series connected thyristor switches SW4-1 and SW4-2 are further serially connected with capacitor C4 and inductor L4 which is then connected across AC network line terminals 38 and 39. It is to be understood that a collection of capacitor-thyristor switch inductors may be connected in parallel across line terminals 38 and 39 in a VAR generator.

In normal operation thyristor switches SW4-1 and SW4-2 are fired or gated in unison and act as a single thyristor switch. However, to ensure unrestricted operation for thyristor switches SW4-1 and SW4-2 during overvoltage conditions and to limit the residual voltage on capacitor C4 or other capacitors which may be in the VAR generator, and to reduce the required surge rating of thyristor switches SW4-1 and SW4-2 or any other thyristor switch contained in a VAR generator, the switches are divided by a tap TP1-TP2. The first firing pulse generator 34 and the second firing pulse generator 36 allow independent control of the upper and lower portions of the thyristor switch now represented by thyristor switches SW4-1 and SW4-2 respectively. Each "portion" of the thyristor switch is shunted by a non-linear clamping device. This is shown by ND1 or ND2 in FIG. 4. The total clamping or breakover voltage level of the non-linear devices ND1 and ND2 is chosen to be higher than the peak voltage appearing across both thyristor switches SW4-1 and SW4-2 during normal operating conditions. Thus, the breakover voltage level to which the total thyristor switch, composed of the two switch "portions" SW4-1 and SW4-2, is subjected when the total thyristor switch is in OFF state, is determined by the sum of the breakover voltage levels of the two series connected clamping devices ND1 and ND2. Therefore, by essentially shorting out one of the clamping devices, either ND1 or ND2, during the time interval when the capacitor C4 is being discharged during the half cycle interval following the turn-off of the thyristor switch, the effective clamping voltage level is reduced to the breakover voltage of either ND1 or ND2. This will therefore limit the residual charge on the capacitor C4 to a low value without requiring an impractically low clamping voltage level for a single clamping device during normal operating conditions. With the present invention it is the breakover voltage level of a single clamping device which determines the residual charge on the capacitor C4, while all of the clamping devices in series support the normal operating voltage.

Any number of thyristor switches each having their companion clamping device may be connected as described. The breakover voltages for the clamping devices can be equal to one another or they may differ. To facilitate construction, preferably the thyristor switch-clamping device combinations are substantially identical having substantially the same breakover voltage with the preferred number of such combinations being 2. Thus, the residual voltage can be limited to any desired amount. For example, with the device shown in FIG. 4, the residual charge level could be either that determined by the breakover voltage of clamping device ND1 or that determined by the breakover voltage of clamping device ND2. Were three combinations used, the residual charge could be made equal to the breakover voltage of any one of the three combinations or the sum of any two of the three combinations. With any arrangement at least one of the thyristor switch must be in the OFF state and at least one of the thyristor switches must be in the ON state. The voltage rating of the thyristor switch is chosen to be equal to or greater than the voltage rating breakover voltage of the non-linear clamping devices. This ensures that the switch is protected at all times prior to the conduction of the non-linear clamping devices. Because of manufacturing tolerances associated with the non-linear clamping devices the voltage rating of the thyristor switches is typically chosen to be ten percent greater than the breakover voltage of the thyristor device.

In the preferred embodiment illustrated in FIG. 4, at each turn-off of the thyristor switch the gate drive signal received at the firing input terminal 20 is extended for an additional half cycle after the firing request from the firing request control circuitry (not shown) has stopped, by pulse stretcher 24 for one of the thyristor switches SW4-1 or SW4-2 as determined by the status of the outputs of the flip-flop 22. If the Q output of flip-flop 22 was active, firing pulse generator 34 would be enabled thus shorting out clamping device ND1 with clamping device ND2 being used to conduct the discharge current. ND2 would continue to conduct until the residual voltage of the capacitor bank decreased to the breakover voltage of ND2. Because thyristor switch SW4-2 is in the OFF state once ND2 ceases to conduct, essentially all current flow will cease. This action would normally occur in less than one-half cycle of the system frequency. The control circuit within the block 21 is representative of one means for selectively keeping one of the thyristor switches in the ON state while placing the remaining switch in the OFF state during a period of time subsequent to the disconnection of the capacitor bank. Where more than two switch-clamping device combinations are used, the logic would be revised accordingly. This control scheme can also be implemented using a microprocessor. Preferably, the thyristor switches SW4-1 and SW4-2 would alternately carry out the capacitor C4 discharge thereby ensuring that both clamping devices ND1 and ND2 are subjected on the average to the same number of current surges. Additional gating circuits may be provided in the control circuit 21 such that the circuit would only be enabled during the detection of an overvoltage condition. This overvoltage enable signal could be provided by a potential transformer or other known means of supplying the required enable signal. One means to provide this overvoltage enable would be to use two, two input AND gates, one input of each connected to one of the outputs of the OR gates 30 and 32. The other input of the AND gates being connected to the overvoltage enable signal. The output of the AND gates would then be sent to the firing pulse generators 34 and 36. With the enable signal present one of two AND gates would have an output to the firing pulse generators. This example is for purposes of illustration only and other means of providing the overvoltage enable signal can be utilized. Use of an overvoltage enable allows a reduction in the breakover voltage of the non-linear clamping devices.

Figure 5:
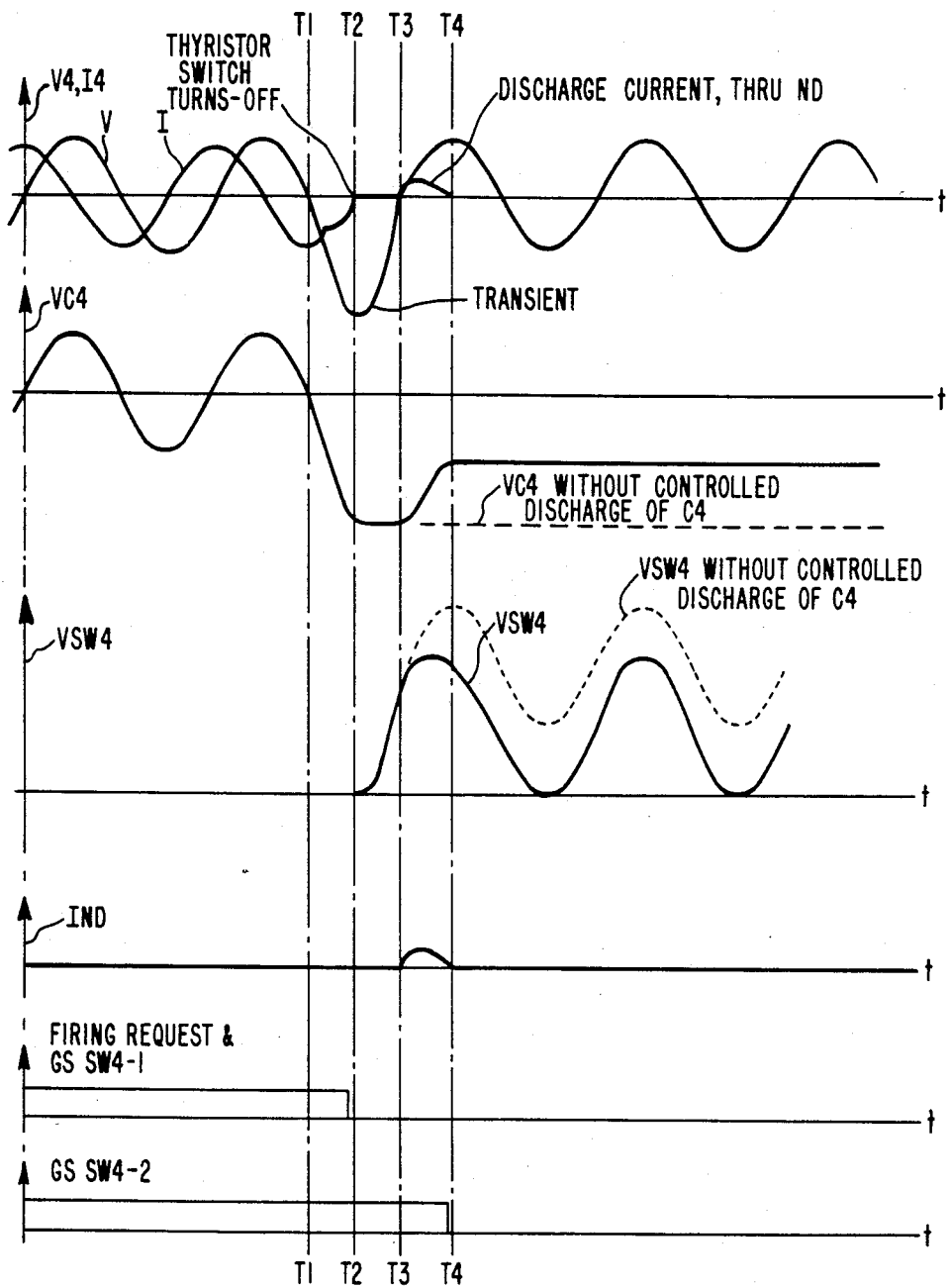
FIG. 5 is a waveform diagram of the voltage and current associated with the schematic of FIG. 4 during a transient overvoltage condition.

Referring now to FIG. 5 there is illustrated a graphical representation of the operation of the thyristor switched capacitor in conjunction with the clamping devices ND1 and ND2 that are assumed to be essentially identical during a transient overvoltage condition. Assuming that the network voltage V4 is relatively constant prior to time T1 and that the AC network requires capacitive compensation prior to time T1, the capacitor bank C4 is switched in and voltage and current are in a normal steady-state as illustrated. At time T1 the AC network voltage V4 is suddenly increased due to, for example, transient disturbances or load switching. This increase in voltage V4 would generally necessitate the reduction of the capacitive VARS supplied by blocking the firing request control signal 20 (FIG. 4) to the thyristor switch thereby disconnecting the capacitor bank C4. However, in the preferred embodiment of the present invention the gating signal is blocked to only one of the two halves of the thyristor switch at the instant of turn-off, the other half receives gating for an additional half cycle. Therefore, for example, gating signal GSSW4-1 to thyristor switch SW4-1 would be blocked before the current crosses zero at time instant T2 as illustrated in FIG. 5. The signal GSSW4-2 would be applied to the other half of the thyristor switch, that is thyristor switch SW4-2 for an additional half cycle as illustrated in FIG. 5. This signal GSSW4-2 would be blocked just before time instant T4. Since the drive to thyristor SW4-1 is blocked, it turns off at T2 at the zero current crossing. At that instant in time the capacitor voltage VC4 will reach the peak overvoltage value with the voltage VSW4 across the total thyristor switch, i.e. SW4-1 plus SW4-2, equal to zero. As the AC network voltage starts to change polarity the voltage across the entire thyristor switch will begin to increase. Further, at time T3 the voltage across the block thyristor switch (in this case SW4-1) will reach the clamping level of the non-linear device ND1. It is to be understood that in the preferred embodiment of the present invention the clamping level of ND1 is chosen so as to be in the range of about 1.8 to about 2 times the normal peak voltage of the system voltage V4. After the clamping level of the non-linear device ND1 is reached the non-linear device will break down and become conductive offering a low resistance. As the AC network voltage V4 further increases, a discharge current IND flows from capacitor C4 via ND1, thyristor switch SW4-2 and inductor L. The discharge of capacitor C4 will continue to time instant T4 at which time the AC network voltage V4 has reached its peak in the opposite direction. Prior to this time the gating signal to the thyristor switch SW4-2 will have been blocked and as is illustrated in FIG. 5 both the capacitor residual voltage V4 and the thyristor switch voltage VSW4 are settled into their normal values.

Figure 6:
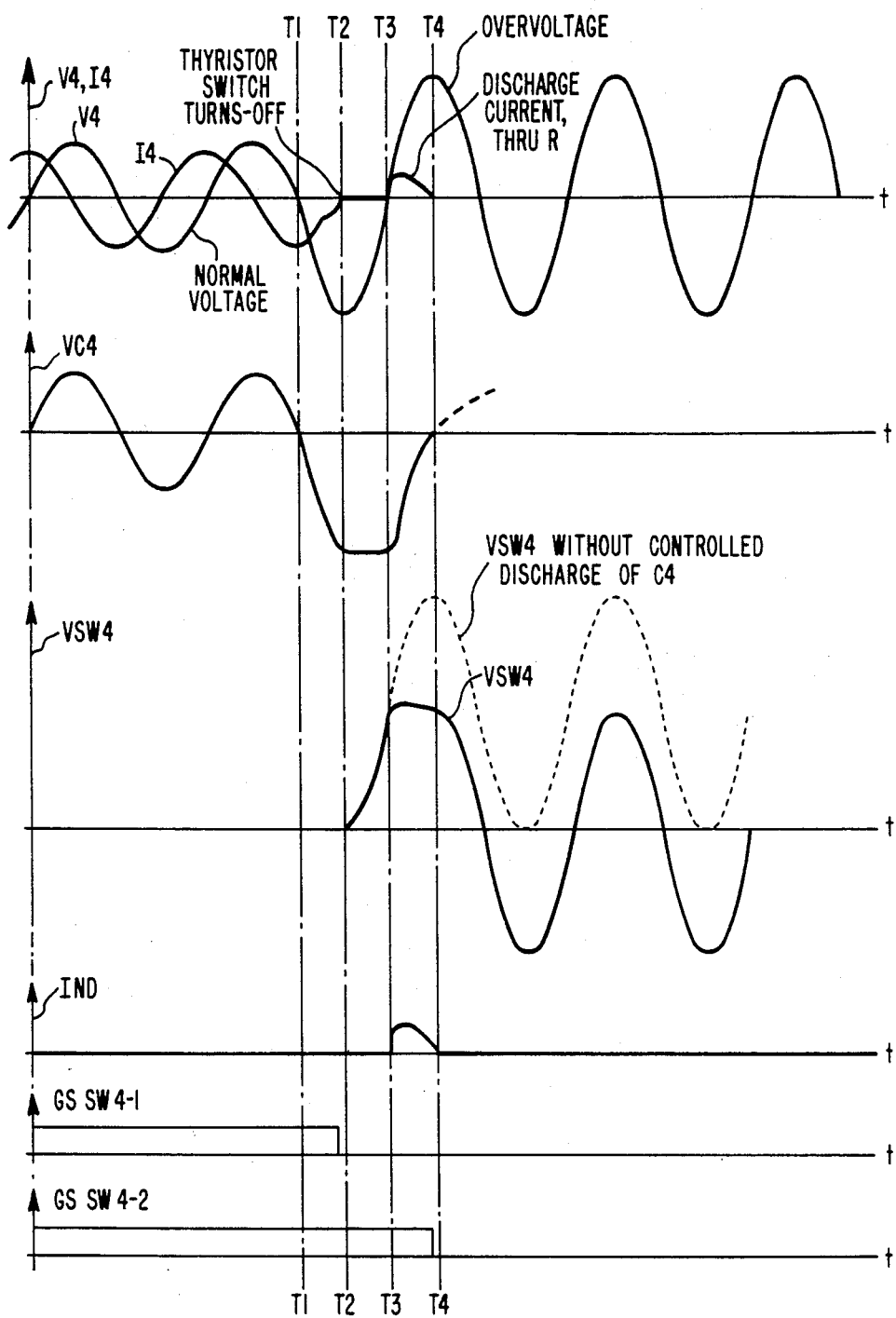
FIG. 6 is a waveform diagram drawn from the schematic of FIG. 4 showing waveform conditions during a sustained overvoltage condition in the AC network.

FIG. 6 shows a similar operation as in FIG. 5 illustrated for the case when a severe sustained overvoltage condition was established in the AC network at time T1. As can be seen, the thyristor voltage is again limited to the peak value of the AC network voltage V4 and the residual capacitor voltage VC4 is reduced approximately to zero due to the magnitude of the overvoltage. For the example shown, if the overvoltage were even more severe the capacitor could start to charge in the positive direction as indicated by the dashed lines for VC4. In the situation where, for limited times, the AC network voltage may vary between one and two times the normal value, the capacitor residual voltage VC4, which would correspondingly vary between one and two times the AC network voltage V4, is limited to a maximum value of the normal peak AC network voltage V4. The peak thyristor switch voltage, which could vary between appropriately two to four times the normal AC network voltage V4 is reduced to or below approximately twice the AC network average voltage level V4.

It is to be understood that many variations of the present invention are possible without departing from the spirit and scope of the present invention. For example, the same clamping device may be utilized each time to discharge an associated capacitor. Therefore, only one and the same half of the switch would be kept in conduction for a half cycle after the firing request has stopped, with the result that the maximum clamping voltage stress would be applied to only the same half of the thyristor switch and its companion clamping device and, therefore only one-half of the thyristor switch need be rated for the clamping voltage level used. Further, a small resistor may be connected between terminals TP1 and TP2 so as to limit the peak discharge current available. Additionally, a different logic scheme for controlling the firing of the thyristors may also be used.

Therefore, the disclosed invention provides a relatively simple and inexpensive means of providing overvoltage protection for both the thyristor switches and controlled discharge of the capacitor banks in a static VAR generator.

I claim:

1. A VAR generator of the type which supplies reactive power to an AC electrical system for regulation thereof, comprising:
    capacitive reactive means interconnectable with the electrical system for supplying the reactive power thereto during a controllable interval of time;
    at least two controllable thyristor switch means interconnected in series circuit relationship with said capacitive reactive means in reactive circuit relationship with the electrical system during said interval of time;
    non-linear clamping means for limiting overvoltage in the VAR generator connected in parallel with each of the switch means, each clamping means having a predetermined breakover voltage at and above which current conduction may occur with the total breakover voltage being approximately equal to the sum of the breakover voltages of each of the clamping means;
    control means interconnected with each of the switch means for selectively keeping at least one but not all of the switch means in an ON state while turning the remaining switch means to the OFF state during a period of time subsequent to the initiation of said OFF state so that the clamping means in parallel with the switch means that are in the OFF state conducts the capacitive reactive discharge current therethrough as long as the voltage condition exceeds the breakover voltage thereof with the switch means that are in the ON state shunting the discharge current around the clamping means connected in parallel therewith thereby limiting the voltage across the capacitive reactive means to a value approximately equal to that of the sum of the breakover voltages of the conducting clamping means.

2. The apparatus of claim 1 wherein the period of time subsequent to the occurrence of the overvoltage in excess of the total breakover voltage is approximately equal to one-half cycle at the frequency of the electrical system.

3. The apparatus of claim 1 wherein the clamping means is comprised of a zinc oxide device.

4. The apparatus of claim 1 wherein the clamping means is comprised of a voltage surge arrestor means.

5. The apparatus of claim 1 wherein the voltage rating of the thyristor switch is equal to or greater than the breakover voltage of the non-linear clamping means connected in parallel therewith.

6. The apparatus of claim 5 wherein the breakover voltages of each of the clamping means are approximately equal to each other.

7. The apparatus of claim 5 wherein the number of switch means is 2 and the number of clamping means is 2.

8. The apparatus of claim 7 wherein the voltage rating of each of the switch means is greater than or equal to twice the normal peak voltage of the AC electrical system.

9. The apparatus of claim 8 wherein the period of time subsequent to the occurrence of the overvoltage in excess of the total breakover voltage is approximately equal to one-half cycle at the frequency of the electrical system.

10. A VAR generator of the type which supplies reactive power to an AC electrical system for regulation thereof, comprising:
   capacitive reactive means interconnectable with the electrical system for supplying the reactive power thereto during a controllable interval of time;
   two controllable thyristor switch means interconnected in series circuit relationship with said capacitive reactive means in reactive circuit relationship with the electrical system during said interval of time;
   first non-linear clamping means connected in parallel with one of the switch means and having a predetermined breakover voltage at and above which current conduction may occur;
   second non-linear clamping means connected in parallel with the other of the switch means and having a predetermined breakover voltage at and above which current conduction may occur, the first and second clamping means limiting voltage in the VAR generator to a total breakover voltage of approximately the sum of the breakover voltages of each of the clamping means,
   control means interconnected with each of the switch means for selectively keeping one of the switch means in an ON state and turning the remaining switch means to the OFF state during a period of time subsequent to the initiation of said OFF state so that the clamping means in parallel with the switch means that is in the OFF state conducts the capacitive reactive discharge current therethrough as long as the voltage exceeds the breakover voltage thereof with the switch means that is in the ON state shunting the discharge current around the clamping means connected in parallel therewith thereby limiting the voltage across the capacitive reactive means to a value approximately equal to that of breakover voltage of the conducting clamping means.

11. The apparatus of claim 10 wherein the breakover voltage of the first clamping means is about 1.8 to about 2 times the normal peak voltage of the AC electrical system and the breakover voltage of the second clamping means is about 1.8 to about 2 times the normal peak system voltage of the AC electrical system.

12. The apparatus of claim 11 wherein the voltage rating of each of the switch means is greater than or equal to twice the normal peak voltage of the AC electrical system.

13. The apparatus of claim 12 wherein the period of time subsequent to the occurrence of the overvoltage in excess of the total breakover voltage is approximately equal to one-half cycle at the frequency of the electrical system.

14. The apparatus of claim 11 wherein the voltage rating of the thyristor switch is equal to or greater than the breakover voltage of the non-linear clamping means connected in parallel therewith.

* * * * *